Sept. 17, 1929.                C. G. PALMER                1,728,505
                              ICE CREAM SCOOP
                            Filed Jan. 11, 1927
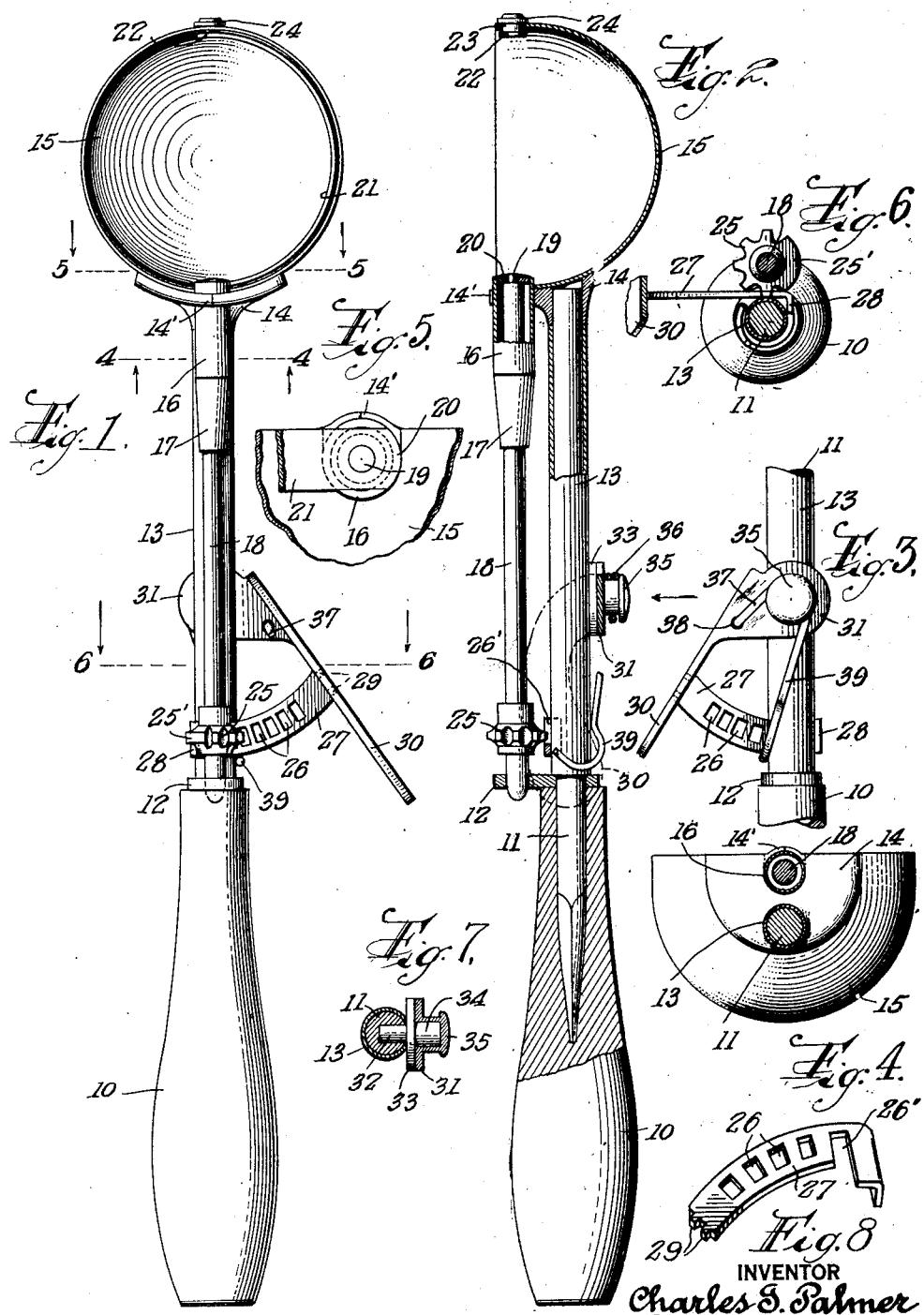
INVENTOR
Charles G. Palmer
BY
Fred C. Fischer
ATTORNEY Patented Sept. 17, 1929

1,728,505

UNITED STATES PATENT OFFICE

CHARLES G. PALMER, OF NEWARK, NEW JERSEY

ICE-CREAM SCOOP

Application filed January 11, 1927. Serial No. 160,325.

This invention relates to that class of contrivances used in serving uniform portions of plastic substances from a mass or stored supply, and has particular reference to devices for dispensing ice cream, fruit ices, frozen pudding and the like.

One of the objects of the invention is to provide an effective, strong and essentially simple scoop having means to discharge its contents in a positive manner, such discharge means being an integral, irremovable element, thus avoiding a common cause of complaint inherent to ordinary scoops having detachable parts requiring mechanical ability to properly assemble and adjust.

A further feature is in the provision of a scoop easily operated and manipulated in one hand, positive means being included to prevent over operation.

Another purpose is to produce a scoop composed of simple rolled, drawn and pressed parts whereby uniformity is attained at a moderate cost.

These several objects are accomplished by the novel construction and combination of elements hereinafter described and illustrated in the accompanying drawings, forming a material part of this disclosure and in which:—

Figure 1 is a top plan view of an embodiment of the invention.

Figure 2 is a partial side elevational, partial longitudinal sectional view thereof.

Figure 3 is a fragmentary bottom plan view of the scoop sweep actuating means.

Figure 4 is a transverse sectional view taken on line 4—4 of Figure 1.

Figure 5 is a similar but fragmentary sectional view taken on line 5—5 of Figure 1.

Figure 6 is a transverse sectional view looking on line 6—6 of Figure 1.

Figure 7 is a sectional view showing in detail the actuator pivot.

Figure 8 is a perspective detail view of the actuator rack.

Fixed in a wooden handle 10 is the reduced end of a metal rod 11, the same having secured to it, at the inner end of the handle, an oblong plate 12, its projecting portion acting as a bearing, as will later be seen.

The continuing portion of the rod 11 is enclosed rigidly in a tube 13, preferably of German silver to prevent corrosion and obviate plating its forward end being brazed or otherwise rigidly connected to an arcuate bracket 14 in turn having its concave face secured to a scoop or cup 15.

This scoop is formed from sheet metal, concavo-convex in shape and including more than a half sphere in its profile and by reason of the bracket, rod and tube is substantially a unit with its operating handle 10.

The bracket 14 contains an opening in its raised central portion partially enclosed by inreaching arms 14' which extend slightly above the edge of the scoop 15 as best seen in Figure 4.

Rotatable in the opening is a tube 16 having an outer conical portion 17, the same being brazed to a rod 18 having its forwardly extending end journalled in the plate 12, the rods 11 and 18 being arranged in spaced parallel relation as best seen in Figure 2.

The opposite, inner end of the rod 18 is reduced at 19 to rigidly engage in an opening in the end member 20 of a scraper 21, this end member being also fixed in the tube to rotate with it as a unit.

The scraper 21 is bent to closely conform to the interior of the scoop 15 with sufficient clearance to permit of a ready sweep in removing the contents and at its opposite end 22 is fixed on a pin 23 freely pivoting in an opening in the wall of the scoop at a point diametrically opposite the rod 18.

Secured permanently to the outer extending end of the pin 23 is a washer 24 preventing the pin from being released and retaining the scraper non-removably in the scoop but free to rotate therein.

Fixed on the outer portion of the rod 18 is a mutilated gear 25 having an uncut portion 25' the purpose of which will later appear.

The teeth of the gear 25 are adapted to engage in corresponding openings 26 in a stamped sheet metal, arcuate rack 27, the outermost tooth space 26' being extended to the edge of the rack plate to allow the gear teeth to enter and engage.

Adjacent the tooth opening 26' the rack plate is bent at a right angle forming a stop 28 to engage the tube 13, thereby limiting the outward movement of the rack.

The opposite end of the rack plate presents lugs 29 which engage and are firmly fixed is corresponding openings in a sheet metal finger lever 30, having a right angled portion 31 pivoted on the shank of the implement in the following manner.

A stud 32 passes through the wall of the tube 13 into the rod 11, being rigid in both, and is provided with an enlarged flat head 33 from which extends a stem 34 on which is revolubly mounted the lever element 31, provided at that point with a hollow knob 35.

Surrounding the reduced portion of the knob 35 are the coils of a spring 36, one of its ends 37 being held in an opening 38 in the lever element 31 and the other end 39 being bent to pass partially around the tube 13.

In addition, the uncut portion of the gear makes contact with the rack plate coincidentally limiting outward movement, while the other end of the uncut gear portion limits the inward or closing movement of the lever.

It is to be noted that all parts are readily made from stock material, assuring duplication of the several elements which are designed for cheap production and easy assembly, and furthermore no loose and dismountable parts are employed.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

1. In an ice cream scoop, the combination with a handle, shank and cup, a bearing on the cup, a rod journalled in said bearing, a scraper mounted in the cup and engaging one end of the rod, a stud fixed to said shank, a knob pivoted on the stud, a sheet metal finger lever integral with the knob, a spring pressing downwardly against the knob to hold the latter fixed on the stud and to normally hold the lever in a predetermined position, a sheet metal arcuate rack fixed to the lever and passing between the rod and shank, said rack having a plurality of slots, a gear fixed to the rod and positioned so that its teeth may enter the slots in the rack, the outermost slot extending to the edge of the rack plate to enable the gear teeth to engage the rack when the device is being assembled.

2. In an ice cream scoop, the combination with a handle, shank and cup, a bearing on the cup, a rod journalled in said bearing, a scraper irremovably mounted in the cup and rigidly engaging one end of the rod, a flanged stud fixed to said shank, a flanged hollow knob pivoted on the stud, a spring pressing downwardly against the flanges on the knob to hold the latter fixed on the stud, a sheet metal finger lever integral with the knob, a sheet metal arcuate rack fixed to the lever and passing between the rod and shank, said rack having a plurality of slots, a mutilated gear fixed to the rod and positioned so that its teeth may enter the slots in the rack, the outermost slot exending to the edge of the rack plate to enable the gear teeth to engage the rack when the device is being assembled.

3. In an ice cream scoop the combination with a handle, shank and cup, a scraper rotatably mounted in the cup, a rod fixed at one end to the scraper and journalled in bearings on the cup and handle, a finger lever mounted on the shank, said finger lever having an arcuate slotted rack fixed thereto, a gear on the rod to engage the slots in the rack, the outermost slot of the rack extending to the edge of the rack plate to enable the gear to engage the rod when the device is being assembled.

This specification signed and witnessed this 7th day of January, 1927.

CHARLES G. PALMER.